(12) United States Patent
Unger et al.

(10) Patent No.: US 7,276,220 B2
(45) Date of Patent: Oct. 2, 2007

(54) PREPARATION OF IRON PENTACARBONYL

(75) Inventors: Gabriele Unger, Brüssel (BE);
Hendrik Schönfelder, Mannheim (DE);
Otto Watzenberger, Mannheim (DE);
Hans-Josef Sterzel,
Dannstadt-Schauernheim (DE); Klaus Kühling, Ellerstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 492 days.

(21) Appl. No.: 10/992,777

(22) Filed: Nov. 22, 2004

(65) Prior Publication Data
US 2005/0135987 A1    Jun. 23, 2005

(30) Foreign Application Priority Data
Dec. 10, 2003    (DE)    ................. 103 58 075

(51) Int. Cl.
*C01G 1/04*    (2006.01)
(52) U.S. Cl. .................................... 423/417
(58) Field of Classification Search ............. 423/417, 423/138
See application file for complete search history.

(56) References Cited

U.S. PATENT DOCUMENTS

| 3,330,629 A | * | 7/1967 | Parshall | ................. 423/277 |
| 3,767,378 A | | 10/1973 | Cochran et al. | ................. 75/1 |
| 3,785,802 A | | 1/1974 | Roberti et al. | |

FOREIGN PATENT DOCUMENTS

| DE | 809 310 | 2/1959 |
| GB | 438 893 | 11/1935 |
| GB | 716 053 | 9/1954 |
| IT | 728 074 | 12/1966 |

OTHER PUBLICATIONS

Sci. Rept. Res. Inst. Tohoku Univ. Serie A, 1 (1949), pp. 319-325.
Ullmann's Encyclopedia of Industrial Chemistry, Sixth Ed., 2000, Electronic Release (WILEY-VCH Verlag GmbH, Weinheim), section "3.Iron Pentacarbonyl".

* cited by examiner

*Primary Examiner*—Wayne A. Langel
*Assistant Examiner*—James Fiorito
(74) *Attorney, Agent, or Firm*—Novak Druce & Quigg LLP

(57) ABSTRACT

Iron pentacarbonyl is prepared by reacting iron with carbon monoxide in suspension and in the presence of a polysulfide of the general formula $RS_xR'$ as a catalyst, where R is an organic radical and x is a number from 2 to 8.

7 Claims, No Drawings

PREPARATION OF IRON PENTACARBONYL

The present invention relates to a process for preparing iron carbonyl, especially iron pentacarbonyl.

In the context of this invention, iron carbonyl refers to compounds of iron and carbon monoxide (CO) in which carbon monoxide ligands are coordinated to an iron atom or a plurality of iron atoms. The industrially most important iron carbonyl which is preferred in the context of this invention is iron pentacarbonyl $Fe(CO)_5$. Iron pentacarbonyl is used industrially as a raw material for preparing fine iron powder (known as carbonyl iron powder) by thermal decomposition with the exclusion of air or for preparing fine iron oxide powders (some such products are referred to as "iron red") by combustion. The quantitatively most significant applications of carbonyl iron powder are powder metallurgy and the production of magnetic cores for electronic components, and the fine iron oxide powders are usually used as color or magnetic pigments. The higher iron carbonyls which are likewise known, $Fe_2(CO)_9$ and $Fe_3(CO)_{12}$, are formed as by-products to a slight extent in the synthesis of iron pentacarbonyl, but play no role in industry, so that iron pentacarbonyl is often also referred to in simplified form just as iron carbonyl, and when reference is made only to iron carbonyl, it is usually iron pentacarbonyl that is meant.

A general review of the preparation, properties and uses of iron carbonyl, especially iron pentacarbonyl, is given by G. Friedrich, F. L. Ebenhöch and B. Kühborth in Ullmann's Encyclopedia of Industrial Chemistry, Sixth Edition, 2000 Electronic Release (WILEY-VCH Verlag GmbH, Weinheim), Section "3. Iron Pentacarbonyl" of the text under the heading "Iron Compounds".

Industrially, iron carbonyl is typically prepared by reacting carbon monoxide with solid reactive iron, for example iron sponge, at a pressure of from 5 to 30 MPa, typically 20 MPa (200 bar) and from 150 to 200° C. To this end, carbon monoxide is passed over the iron in a reactor, the iron carbonyl which forms is removed in a condenser from the gas leaving the reactor and decompressed to the pressure in the workup section of the plant. The process is typically carried out in semibatch mode (semicontinuous); iron is thus initially charged in the reactor and carbon monoxide is passed through the reactor until the initially charged iron has been consumed, whereupon the reactor is opened and further iron is introduced. Depending on the precise composition of the iron used, the thus prepared iron carbonyl contains impurities resulting from other volatile carbonyls, for example nickel carbonyls, chromium carbonyls, molybdenum carbonyls and/or tungsten carbonyls, and also other impurities, for example lubricant oil, sulfur compounds or water. The iron carbonyl is typically freed of such impurities by single or multiple distillation.

Often, sulfur-containing iron in the form of granules having a sulfur content of, for example, 1-4% by weight is also used instead of iron sponge, as taught, for example, in DE 634 283 C1, because this sulfur addition has a reaction-accelerating effect. Equally, a corresponding mixture of sulfur-free and sulfur-containing iron of the desired net composition may be used. In Z. Anorg. Allg. Chem. 262 (1950) 15-24, W. Hieber and O. Geisenberger report on their investigations of this effect of sulfur, which they attribute to intermediate formation of iron carbonyl sulfides and their disproportionation to form iron carbonyl, and on the formation of the carbonyl sulfide $Fe_3S_2(CO)_8$ from hydrogen sulfide, carbon monoxide and iron. G. Heinicke, N. Bock and H. Harenz, Z. Anorg. Allg. Chem. 372 (1970), 162-170 and also W. Hieber and J. Gruber, Z. Anorg. Allg. Chem. 296 (1958) 91-103 also discuss $Fe_2S_2(CO)_6$ and $Fe_3S_2(CO)_9$ as catalytically active intermediates formed in situ.

One of the great disadvantages of the industrial process is the semibatchwise operation which makes it necessary to regularly open the reactor to replenish iron. Owing to the high toxicity of iron carbonyl and the need to exclude oxygen, prolonged flushings of the reactor with inert gas are necessary. This process version reduces the space-time yield achievable in a reactor considerably and is economically unsatisfactory. Attempts have therefore already been made in the past to be able to introduce iron continuously into a reactor under the conditions of the iron carbonyl synthesis, for instance as a fluidized bed process according to the teaching of U.S. Pat. No. 3,785,802 or as taught by C. Dofour-Berte and E. Pasero in Chim. Ind. (Milan) 49 (1967), p. 347-354, or, avoiding the problem of continuously introducing solids into pressure reactors, to establish an alternative synthetic route starting from dissolved iron salts, as disclosed in IT 728 074. In a review article in Die Chemie 55 (1942), p. 7-11, W. Hieber mentions similar experiments for preparing nickel carbonyl from carbon monoxide and nickel sulfide in alkaline suspension, or by reacting carbon monoxide with nickel salts of organic thio acids. However, it has hitherto not been possible to commercially utilize any of these approaches, which might be attributable overall to unsatisfactory yields.

One means of circumventing the problem is to use pumpable suspensions of iron, which can in principle be introduced into pressure reactors continuously in a simpler manner than solids. In Sci. Rept. Res. Inst. Tohoku Univ., Series A, 1 (1949) 319-325, T. Okamura, H. Kozima and Y. Masuda report on their studies of the preparation of iron carbonyl with the common process in semibatchwise operation, but mention that the use of suspensions in their case met with difficulties in practice. In contrast, DD 17 606 discloses a process for continuously reacting solid suspensions with gases in a bubble column reactor equipped with sieve trays, which is also taught there for the preparation of iron carbonyl from a suspension of iron powder in petroleum and carbon monoxide and is applied practically in an example.

It is an object of the present invention to find an improved process for preparing iron pentacarbonyl, which can be carried out with higher space-time yield and under milder conditions than the industrially customary process.

Accordingly, a process has been found for preparing iron pentacarbonyl by reacting iron with carbon monoxide in suspension and in the presence of a sulfur catalyst, which comprises using a polysulfide of the general formula $RS_xR'$ as the catalyst, where R and R' are each organic radicals and x is a number from 2 to 8.

The process according to the invention proceeds under milder conditions than the common industrial processes and allows higher space-time yields.

The catalyst used in the process according to the invention is a polysulfide of the general formula $RS_xR'$.

R and R' are each independently an organic radical such as alkyl, alkenyl, alkynyl, cycloalkyl, cycloalkenyl, aryl, alkaryl or aralkyl. They may be substituted by further organic radicals, include heteroatoms and also be joined together. Examples of R and R' radicals usable in the process according to the invention are linear saturated alkyl radicals having up to 18 carbon atoms such as methyl, ethyl, propyl, butyl, pentyl, hexyl, heptyl, octyl, nonyl or decyl, saturated cyclic alkyl radicals having from three to 12 carbon atoms such as cyclopentyl, cyclohexyl or cycloheptyl, or branched saturated alkyl radicals such as 2-propyl, 2-butyl, 2-methyl- 1-propyl, 1,1-dimethylethyl or all branched isomeric pentyl, hexyl, heptyl, octyl, nonyl or decyl radicals. R and R' may equally be aromatic radicals, for example phenyl or 1- or 2-naphthyl. R and R' are preferably each linear alkyl radicals, especially those having from one to four carbon atoms, especially methyl, ethyl, 1-propyl or 1-butyl radicals. In a particularly preferred manner, both R and R' are methyl radicals.

The number x in the general formula is generally at least 2, preferably at least 2.5 and more preferably at least 3, and also generally at most 10, preferably at most 6 and more preferably at most 5. For example, x is 4.

Such compounds are not usually present as defined compounds. Dimethyl disulfide and dimethyl trisulfide can be obtained as pure substances, but other such compounds are always present as a mixture of different compounds whose net composition corresponds to the desired general formula RSxR'. This formula corresponds to the average of the formulae of the compounds present in the mixture.

Some of these compounds are commercially available, especially dimethyl disulfide, dimethyl trisulfide and dimethyl tetrasulfide, although the latter is again a compound mixture. All of these compounds may also be obtained simply by the known process by means of reaction of a disulfide RSSR' with elemental sulfur. Processes for preparing such disulfides are known.

To prepare of a polysulfide $RS_xR'$, a disulfide RSSR' is reacted with elemental sulfur, generally yellow sulfur $S_8$, over a catalyst. The catalyst used may be any acidic catalyst, i.e. any substance that has Brønsted or Lewis acidity. Examples of known catalysts of this reaction are acidic molecular elemental compounds, oxidic acidic solids or acidic ion exchangers, for instance sulfonated polymers (for example sulfonated styrene or styrene-divinylbenzene polymers). Particularly simple and convenient and therefore preferred is the use of acidic ion exchangers. The reaction may, as desired, be carried out without solvent or in the presence of a solvent. When a solvent is used, a solvent inert toward the reaction partners is used. Examples of inert solvents are hydrocarbons or hydrocarbon mixtures such as pentane, hexane, cyclohexane, benzine, benzene, toluene or xylene. However, preference is given to carrying out the reaction without solvent.

To carry out the reaction, the two components, disulfide and elemental sulfur, are heated until the reaction is complete. The amounts of disulfide and sulfur used are selected in such a way that, in accordance with the stoichiometry, the desired number x in the general formula $RS_xR'$ is set. The temperature in this reaction is generally set to at least 20° C., preferably at least 40° C. and more preferably at least 80° C., and also generally at most 150° C., preferably at most 120° C. and more preferably at most 110° C. The typical reaction time is generally at least 30 minutes, preferably at least 60 minutes and more preferably at least 90 minutes, and also generally at most 6 hours, preferably at most 4 hours and more preferably at most 3 hours.

This generally forms a polysulfide of the general formula $RS_xR'$ which is a mixture of different polysulfides $RS_aR$, $R'S_bR'$ and $RS_cR'$ and dissolved sulfur, where a, b and c are numbers which, averaged with one another and with the stoichiometric proportion of dissolved sulfur, give the value x set by the amounts of disulfide and sulfur used.

The catalyst is filtered off and, if a solvent has been used, it is removed (for example by evaporation), unless said solvent is also used as a suspension agent in the subsequent reaction of iron with carbon monoxide; in this case, there is no need to remove it.

The process according to the invention for preparing iron pentacarbonyl is a suspension process. To this end, iron powder is initially charged in suspension and reacted with carbon monoxide in the presence of the polysulfide catalyst. The catalyst is generally used in an amount of at least 0.1 gram per kilogram of metallic iron used for the reaction with carbon monoxide, preferably in an amount of at least 0.5 g/kg and more preferably at least 1 g/kg, and also generally at most 10 g/kg, preferably at most 8 g/kg and more preferably at most 6 g/kg. Higher amounts of catalyst are usually uneconomic.

To carry out the process according to the invention, iron is initially charged in the form of a suspension to which the catalyst is added. A suitable suspension agent is any suspension agent which is sufficiently inert toward the reaction partners. Examples of inert suspension agents are hydrocarbons or hydrocarbon mixtures such as pentane, hexane, cyclohexane, benzine, petroleum, benzene, toluene or xylene. A preferred suspension agent is iron pentacarbonyl.

Iron is used in a form which is suspendable. To this end, the iron particles should not be too large, since a very high stirrer output is otherwise required. Suitable are, for example, iron granules or iron powder. A suitable average particle size of the iron is generally at most 10 mm, preferably at most 8 mm and more preferably at most 6 mm.

The suspension is stirred unless the iron used is so fine that it sediments to a sufficiently small extent.

This suspension is admixed with carbon monoxide by building up carbon monoxide pressure. The reaction is generally carried out at a temperature of at least 100° C., preferably at least 130° C. and more preferably at least 140° C., and also generally at most 200° C., preferably at most 170° C. and more preferably at most 160° C. An example of a very suitable temperature is 150° C. The carbon monoxide pressure applied is generally at least 5 MPa (50 bar), preferably at least 10 MPa (100 bar) and more preferably at least 12 MPa (120 bar), and also generally at most 25 MPa (250 bar), preferably at most 20 MPa (200 bar) and more preferably at most 18 MPa (180 bar). An example of a very suitable pressure is 15 MPa (150 bar). When inert gases are present in addition to carbon monoxide, these values are set as the partial carbon monoxide pressure. Although it is possible to dilute the carbon monoxide with inert gases, the achievable space-time yield falls. Although higher pressures than those mentioned above are likewise possible, they bring no industrially significant improvement.

The process may be carried out in batchwise operation (i.e. discontinuously), in semibatchwise operation (i.e. semicontinuously) or continuously.

In batchwise operation, the iron, the catalyst and the suspension agent are initially charged and carbon monoxide is injected. On completion of the reaction, the mixture is decompressed, the iron pentacarbonyl formed and the suspension agent are freed of solid residues by filtration, the suspension agent and the iron pentacarbonyl are separated from each other, for example by distillation, and the iron carbonyl is worked up as usual. The separation of the iron carbonyl from the suspension agent of course becomes unnecessary when iron carbonyl is used as the suspension agent.

In the case of semibatchwise operation, iron, the catalyst and the suspension agent are initially charged and the system is flowed through with carbon monoxide until the reaction comes to a standstill for the lack of iron to react. The gas stream leaving the reactor comprises, in addition to carbon monoxide, the iron pentacarbonyl formed and possibly also suspension agent depending on its vapor pressure. Suspension agent and iron carbonyl are condensed out and separated, for example by distillation, and the product is worked up as usual.

However, the process according to the invention may also be carried out continuously. To this end, a pumpable suspension of iron in suspension agent is conveniently prepared and introduced continuously into the reactor. The catalyst is either added to this suspension or introduced directly into the reactor. Carbon monoxide is introduced into the reactor. The amounts of iron and carbon monoxide introduced into the reactor may be adjusted in such a way that they react fully with one another in the reactor, but partial conversion based on carbon monoxide or else based on iron may also be attained. A gas stream drawn off from the reactor, like the gas stream obtained in semibatchwise operation, comprises carbon monoxide, iron pentacarbonyl and suspension agent, and is worked up in the same way. A liquid stream drawn off from the reactor, like the crude product obtained in batchwise operation, comprises iron pentacarbonyl, suspension agent and unreacted iron and is worked up in the same way.

Unconverted carbon monoxide and unconverted iron used can be again anew.

EXAMPLES

Preparation of the Catalyst

To prepare dimethyl polysulfide $H_3C-S_x-CH_3$, yellow sulfur and dimethyl disulfide (purchased from Oxford Chemicals Ltd., North Gare, Seaton Carew, Hartlepool, Great Britain) were heated to 90° C. for 2 hours in the appropriate molar ratio with the ion exchanger Lewatit MP62 as a catalyst (5 g of ion exchanger per mol of sulfur) and subsequently filtered off. Additionally, commercially available dimethyl trisulfide and dimethyl tetrasulfide, likewise from Oxford Chemicals Ltd., were used.

Experimental Procedure

The reactions were carried out in a stirred 300 ml autoclave which was charged with 50 g of iron powder (M 40 from Höganäs AB, Höganäs, Sweden, sulfur content 0.011% by weight) and 50 ml (72 g) of iron pentacarbonyl and also 100 mg of catalyst. Once the autoclave had been sealed, 5 MPa (50 bar) of CO were injected and the autoclave was heated to 150° C. On attainment of this temperature, 150 bar of CO were injected and the autoclave was connected via an automatically controllable valve to a storage vessel for CO (a CO-filled autoclave of volume 2.5 l under an initial pressure of 280 bar). The CO pressure in the 300 ml autoclave was kept constant by feeding carbon monoxide from the storage vessel by virtue of the automatic valve control in the event of a fall in pressure. The amount of CO consumed within two hours after attainment of the reaction temperature was determined and then the conversion achieved up to this point and the space-time yield achieved up to then were calculated.

The experimental results of Examples 1-6 are summarized in the table which follows.

A comparative example with sulfurized iron granules similar to the common industrial process (but which is not carried out in a suspension) exhibited an induction phase of around 5 hours.

| Ex. # | Catalyst | Conversion [mol %] | Space-time yield [kg Fe(CO)$_5$ m$^{-3}$ h$^{-1}$] |
|---|---|---|---|
| 1 | $H_3CS_2CH_3$ (Oxford) | 24 | 304 |
| 2 | $H_3CS_3CH_3$ (Oxford) | 87 | 1102 |
| 3 | $H_3CS_4CH_3$ (Oxford) | 74 | 937 |
| 4 | $H_3CS_4CH_3$ | 76 | 963 |
| 5 | $H_3CS_5CH_3$ | 82 | 1039 |
| 6 | $H_3CS_6CH_3$ | 79 | 1001 |

The examples show that, using the process according to the invention, high conversions and space-time yields are achievable in considerably shorter time and without induction phase.

What is claimed is:

1. A process for preparing iron pentacarbonyl by reacting iron with carbon monoxide in suspension and in the presence of a sulfur catalyst, which comprises using a polysulfide of the general formula $RS_xR'$ as the catalyst, where R and R' are each organic radicals and x is a number from 2 to 10.

2. The process according to claim 1, wherein R and R' are each identical alkyl radicals having from one to four carbon atoms.

3. The process according to claim 2, wherein R and R' are each methyl radicals.

4. The process according to claim 1, wherein x is a number from 2.5 to 6.

5. The process according to claim 4, wherein x is a number from 3 to 5.

6. The process according to claim 1, wherein the reaction is carried out at a temperature of at least 100° C. and at most 200° C.

7. The process according to claim 6, wherein the reaction is carried out at a carbon monoxide pressure of at least 5 MPa (50 bar) and at most 25 MPa (250 bar).

* * * * *